United States Patent
Fast et al.

[11] Patent Number: 5,448,461
[45] Date of Patent: Sep. 5, 1995

[54] METHOD PERTAINING TO VEHICLE HEADLAMPS WHICH EMIT ULTRAVIOLET LIGHT, AND AN ARRANGEMENT HEREFOR

[75] Inventors: Peder Fast, Kullavik; Lars A. Bergkvist, Själevad, both of Sweden

[73] Assignee: Ultralux AB, Sweden

[21] Appl. No.: 107,803

[22] Filed: Aug. 25, 1993

[30] Foreign Application Priority Data

Feb. 25, 1991 [SE] Sweden .................. 9100544

[51] Int. Cl.$^6$ .................................... F21V 9/00
[52] U.S. Cl. ............................ 362/293; 362/61; 359/350
[58] Field of Search ............ 359/350, 353, 359; 362/293, 263, 230, 231, 61

[56] References Cited

U.S. PATENT DOCUMENTS

| | | | |
|---|---|---|---|
| 2,382,939 | 8/1945 | Koch | 176/122 |
| 3,887,744 | 6/1975 | Tomita et al. | 359/350 |
| 4,167,490 | 9/1979 | Looney | 359/350 |
| 4,586,116 | 4/1986 | Kasboske | 362/293 |
| 4,664,470 | 5/1987 | Yerazunis | 359/359 |
| 4,970,628 | 11/1990 | Bergkvist | 362/61 |

Primary Examiner—Ira S. Lazarus
Assistant Examiner—Alan B. Cariaso
Attorney, Agent, or Firm—Nies, Kurz, Bergert & Tamburro

[57] ABSTRACT

A method pertaining to vehicle headlamps which emit ultraviolet light and which include a light source for generating both ultra-violet light and visible light, and a filter which is placed in the beam path between the light source and the surroundings and which is intended to substantially filter out visible light and to transmit ultra-violet light, said headlamp, however, unintentionally transmitting a given proportion of visible light, such as red and blue light, of low intensity. The invention is characterized by arranging the headlamp (1) so that the light source (2) and the filter (5; 6) in combination will intentionally allow a predetermined proportion of visible light of a light colour to pass therethrough; by causing said visible light to be sufficiently strong to dominate over said unintentionally emitted light on the part of a viewer, and by causing said predetermined proportion of visible light to have an intensity which lies beneath the intensity at which the light intentionally emitted would dazzle a viewer in combination with any other visible light intentionally emitted by the headlamp. The invention also relates to an arrangement.

10 Claims, 1 Drawing Sheet

U.S. Patent Sep. 5, 1995 5,448,461
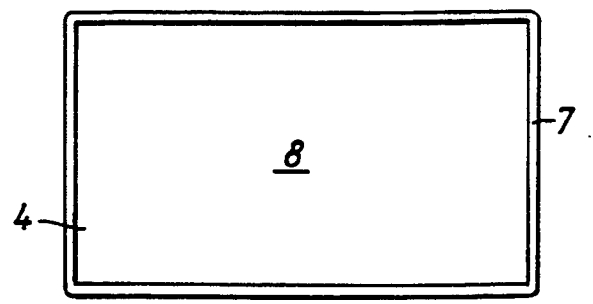
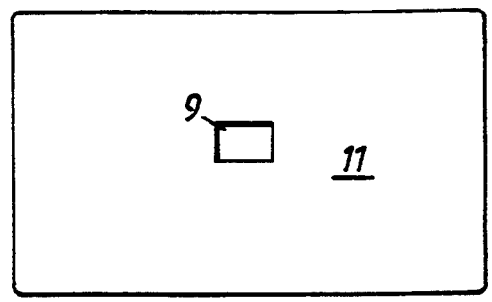
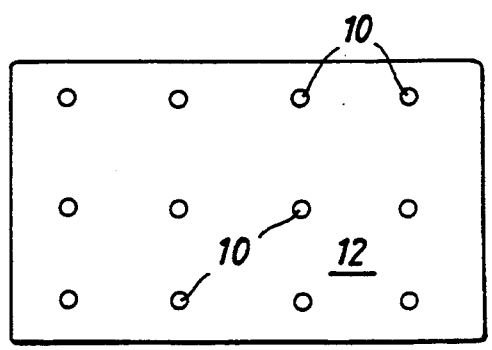
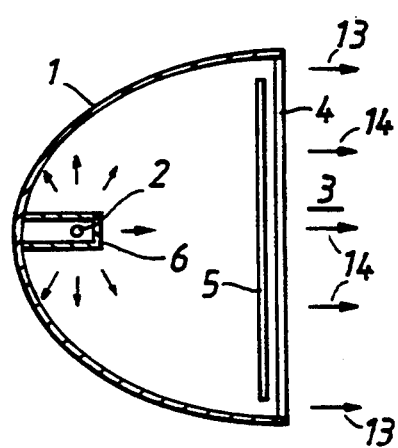

METHOD PERTAINING TO VEHICLE HEADLAMPS WHICH EMIT ULTRAVIOLET LIGHT, AND AN ARRANGEMENT HEREFOR

The present invention relates to a method pertaining to vehicle headlamps which emit ultraviolet light, and to an arrangement herefor.

BACKGROUND OF THE INVENTION

In recent times, great interest has been shown in the development of vehicle headlamps which emit light within the ultraviolet wavelength range. Lamps which emit ultraviolet light have the decisive advantage of enabling fluorescent objects to be seen by the driver of the vehicle. Swedish Patent Specification No. 8704118-2, having a corresponding U.S. Pat. No. 4,970,628 to LARS A BERGKVIST, among others, describes one such headlamp. This headlamp functions to emit both visible light and ultraviolet light. The headlamp is constructed to produce a full-beam lobe with ultraviolet light and a dipped beam lobe with visible light. It is previously known to provide separate headlamps which emit essentially only ultraviolet light.

Woods glass is an example of a filter that can be used to filter-out visible light. This filter, however, has the drawback of allowing a given proportion of red light and a given proportion of blue light to pass through. Although the red and the blue light are weak, they are nevertheless found to be disturbing or discomforting to people who look into the headlamp which emits said light. Although this effect is difficult to describe, it has been judged sufficiently significant to wish to reduce or to eliminate the same. The effect is much more noticeable with headlamps which emit essentially only ultraviolet light. One of the reasons for this effect is that red and blue light is diffracted by the human eye to different extents, which can be referred to the phenomenon of bichromatic abberation. This would give rise to the aforesaid feeling of discomfort.

Attempts have been made to produce improved filters with well-defined limits. It is very difficult to produce filters with well-defined limits, and it is also doubtful that this is the correct procedure to follow, since the sensitivity of the eye does not decrease with a sharp limit between different wavelengths.

The difficulties experienced by people who look into a vehicle headlamp which emits ultraviolet light are eliminated, or at least considerably reduced, by means of the present invention.

SUMMARY OF THE INVENTION

Accordingly, the present invention relates to a method pertaining to vehicle headlamps which emit ultraviolet light and which include a light source for generating both ultraviolet light and visible light, and a filter which is placed in the beam path between the light source and the surroundings and which is intended to substantially filter out visible light and to transmit ultraviolet light, the headlamp, however, unintentionally transmitting a given proportion of visible light, such as red and blue light, of low intensity. The method is characterized by constructing the headlamp so that the light source and the filter in combination will intentionally allow a predetermined proportion of visible light of a light colour to pass therethrough; by causing such visible light to be strong enough to dominate over the unintentionally emitted light as seen by a viewer, and by causing the predetermined proportion of visible light to have an intensity which lies beneath the intensity at which the light intentionally emitted would dazzle a viewer in combination with any other visible light intentionally emitted by the headlamp.

The invention also relates to an arrangement in vehicle headlamps which emit ultraviolet light, the headlamp including a light source for producing both ultraviolet light and visible light, and with a filter placed in the beam path between the light source and the surroundings, the filter being constructed to essentially filter-out visible light and to transmit ultraviolet light, the headlamp, however, unintentionally emitting an amount of visible light, such as red and blue light, of low intensity, the headlamp being constructed so that its light source and the filter, in combination, will intentionally allow a predetermined proportion of visible light of light colour to pass through, such intentionally passed visible light being strong enough to dominate over the unintentionally emitted visible light when viewed by a viewer, and to have an intensity which is beneath the intensity at which the intentionally-emitted light would dazzle said viewer in combination with any other visible light that is intentionally emitted.

BRIEF DESCRIPTION OF THE DRAWING

The invention will now be described in more detail with reference to exemplifying embodiments thereof illustrated in the accompanying drawing, in which FIG. 1 is an elevation view of the face of a headlamp and illustrates a first exemplifying embodiment of the inventions;

FIG. 2 is an elevation view of the face of a headlamp and illustrates a second exemplifying embodiment of the invention; is an elevation view of the face of a headlamp and FIG. 3 illustrates a third exemplifying embodiment of the invention; and FIG. 4 is a schematic, vertical, front to rear, cross-sectional view of a headlamp and illustrates two different embodiments of the invention.

DESCRIPTION OF THE PREFERRED EMBODIMENTS

FIG. 4 illustrates a vehicle headlamp 1 which is intended to emit ultraviolet light. The headlamp 1 includes a light source 2 which functions to produce both ultraviolet light and visible light. The light source is preferably a mercury discharge lamp. A filter is provided in the beam path between the light source 2 and the surroundings 3, primarily in front of the headlamp and behind the face glass 4. The filter is mainly intended to filter-out visible light and to emit ultraviolet light.

The filter is arranged in two different ways in the FIG. 4 illustration. One method of arranging the filter is to place the filter 5 inwardly of the headlamp glass 4, or to incorporate the filter in the actual headlamp glass itself. Another method is to form the filter as a cylindrical cup 6 around the actual light source 2. Still another method is to integrate the filter with the lamp glass of the light source. In all of these alternative methods, the light emitted by the light source will be filtered so that the light emitted by the vehicle headlamp will be ultraviolet light. The filter may be comprised of Woods glass or some other suitable filter material.

It has been found that such headlamps, however, will also emit a given proportion of visible light, such as red or blue light of low intensity, despite the intention of filtering-out all, or substantially all, visible light, so that a person gazing into the lamp will not experience the presence of visible light.

According to the invention, the headlamp is constructed so that the light source and the filter are caused, in combination, to intentionally allow a predetermined proportion of visible light of a light colour to pass through, said visible light being given strength enough to dominate over the light that is unintentionally emitted, as experienced by a viewer and to give said unintentional light an intensity which lies beneath the intensity at which the intentionally-emitted light would dazzle a viewer in combination with any other visible light intentionally emitted by the headlamp. In this respect, it is not important where the filter is placed in the beam path of the headlamp such that a part of the light produced by the light source is emitted by the headlamp without having been filtered with regard to visible wavelengths. By any other intentionally-emitted visible light is meant light from other vehicle headlamps.

Thus, according to one preferred embodiment of the invention, the visible light which is emitted intentionally is mainly yellow or white light. Since discharge lamps of the aforesaid kind emit a high proportion of white light, it is not necessary to filter the emission of white light. In order to emit yellow light, or light of some other colour, it is necesary, of course, to filter the visible light to be emitted to the colour intended somewhere in the beam path, so as to obtain light of the colour intended, in a known manner.

It has surprisingly been found that the emission of a minor quantity of visible light of light colour and of an intensity such as not to dazzle a viewer is sufficient to fully dominate over the blue and red light.

This eliminates the cause of the discomfort felt when looking into a conventional headlamp.

The visible light is preferably emitted over a given area of the headlamp glass 4. According to one preferred embodiment, this surface area of the headlamp glass through which visible light is intentionally emitted is about 0.02 to 5%, preferably about 0.2 to 2%.

According to one preferred embodiment, the headlamp is constructed so that the intentionally-emitted visible light is caused to be emitted as an outer frame 7 within which essentially solely ultraviolet light is emitted. The frame 7 extends around the edge of the headlamp glass 4. Ultraviolet light is thus emitted through the remaining surface 8. This embodiment is illustrated in FIG. 1, which illustrates a headlamp schematically from the front.

By the expression arranging the headlamp in the described manner is meant to construct the filter in combination with the light source in a manner to achieve said result. One skilled in this art will have no problem in constructing the headlamp in this way.

One such method is to use a filter 5 according to FIG. 4, in which visible light 13 is emitted at the edges of the filter 5, while ultraviolet light 14 is emitted over an area corresponding to the filter area.

FIGS. 2 and 3 illustrate two alternative second preferred embodiments in which the headlamp is constructed such that the intentionally-emitted visible light is emitted at one point 9 or several points 10 over the surface of the headlamp glass where substantially solely ultraviolet light is emitted through the remainder of the headlamp surface 11; 12.

These points may be uniformly distributed over the surface of the headlamp glass and may be provided in a number such that the whole of the headlamp glass will appear to shine weakly in said light colours.

It is obvious that the filter, in combination with the light source, can be given a large number of different configurations with regard to the areas in which visible and ultraviolet light are emitted, and that FIGS. 1–3 merely illustrate examples of such configurations. The essential criterion is that sufficient visible light is emitted to dominate over the blue and red light so as to greatly reduce or eliminate the cause of discomfort mentioned in the introduction, at the same time as the emitted visible light will not dazzle a person observing the headlamp.

Although the invention has been described with reference to different exemplifying embodiments thereof, it will be understood that these embodiments can be modified in many ways. For example, the headlamp can be constructed to emit visible light of colours different to those before mentioned. Furthermore, other filters can be used.

Neither is the present invention restricted to any particular headlamp construction.

The invention is therefore not restricted to the aforedescribed and illustrated embodiments, since modifications and variations can be made within the scope of the following claims.

We claim:

1. A method pertaining to vehicle headlamps which emit ultraviolet light and which include a light source for generating both ultraviolet light and visible light, and a filter which is placed in the beam path between the light source and the surroundings and which is intended to substantially filter out visible light and to transmit ultraviolet light, said headlamp, however, unintentionally transmitting a given proportion of visible light, such as red and blue light, of low intensity, and constructing the headlamp (1) so that the light source (2) and the filter (5; 6), in combination, will intentionally allow a predetermined proportion of visible light of a light colour to pass therethrough; causing said visible light to be strong enough to dominate over said unintentionally emitted visible light on the part of a viewer, and by causing said predetermined proportion of intentionally allowed visible light to have an intensity which lies beneath the intensity at which the light intentionally emitted would dazzle a viewer in combination with any other visible light intentionally emitted by a vehicle headlamp.

2. A method according to claim 1, characterized in that the intentionally-emitted light is substantially yellow or white light.

3. A method according to claim 1, further including: arranging the headlamp (1) so that the intentionally-emitted visible light is emitted as an outer periphery of visible light (7), within which, substantially only ultraviolet light is emitted.

4. A method according to claim 1, further comprising constructing the headlamp (1), to include a headlamp glass, so that the intentionally-emitted visible light is emitted in at least one (9) surface area of the headlamp glass (4) wherein substantially only ultraviolet light is emitted over the remaining surface area (11; 12) of the headlamp glass (4).

5. A method according to claim 1, characterized in that the proportion of the surface of the headlamp glass (4) where visible light is intentionally emitted is about 0.02 to 5%, preferably about 0.2 to 2%.

6. An arrangement in vehicle headlamps which emit ultraviolet light, said headlamp including a light source for producing both ultraviolet light and visible light, and a filter placed in the beam path between the light source and the surroundings and constructed to essentially filter-out visible light and to transmit ultraviolet light, said headlamp, however, unintentionally emitting visible light, such as red and blue light, of low intensity, wherein the headlamp (1) is constructed so that the light source (2) and the filter (5; 6), in combination, will intentionally allow a predetermined proportion of visible light of light colour to pass through, said visible light being strong enough to dominate over the unintentionally emitted visible light as experienced by a viewer, and to have an intensity which is beneath the intensity at which the intentionally-emitted light would dazzle said viewer, in combination with any other visible light that is intentionally emitted by a vehicle headlamp.

7. An arrangement according to claim 6, characterized in that the intentionally-emitted light is substantially yellow or white light.

8. An arrangement according to claim 6, wherein the headlamp (1) is constructed so that the intentionally-emitted visible light is emitted as an outer periphery (7) of visible light within which substantially only ultraviolet light is emitted.

9. An arrangement according to claim 6, wherein said headlamp includes a headlamp glass and the headlamp (1) is constructed so that the intentionally-emitted visible light is emitted in at least one (9) surface area of the headlamp glass (4), wherein substantially only ultraviolet light is emitted over the remaining surface area (11; 12) of the headlamp glass (4).

10. An arrangement according to claim 6, characterized in that the proportion of the surface of the headlamp glass (4) through which visible light is intentionally emitted is about 0.1 to 20%, preferably about 0.5 to 5%.

* * * * *

UNITED STATES PATENT AND TRADEMARK OFFICE
CERTIFICATE OF CORRECTION

PATENT NO. :  5,448,461
DATED      :  September 5, 1995
INVENTOR(S) : PEDER FAST et al.

It is certified that error appears in the above-identified patent and that said Letters Patent is hereby corrected as shown below:

On the COVER PAGE   correct item [22] to read:

[22]  PCT Filed:  February 19, 1992

On the COVER PAGE  add the following items:

[86]  PCT No.:  PCT/SE92/00100

§ 371 Date: August 25, 1993
        § 102(e) Date: November 5, 1993

[87]  PCT Pub. No.:  WO92/14628

PCT Pub. Date:  September 3, 1992

Signed and Sealed this

Ninth Day of January, 1996

*Attest:*

BRUCE LEHMAN

*Attesting Officer*     *Commissioner of Patents and Trademarks*